United States Patent
Basavanthappa et al.

(10) Patent No.: US 9,900,391 B2
(45) Date of Patent: Feb. 20, 2018

(54) AUTOMATED ORCHESTRATION OF INFRASTRUCTURE SERVICE BLOCKS IN HOSTED SERVICES

(71) Applicant: Microsoft Technology Licensing, LLC, Redmond, WA (US)

(72) Inventors: Nandakishor Basavanthappa, Sammamish, WA (US); Phillip Beish, Seattle, WA (US); Pritvinath Obla, Bellevue, WA (US); Brian O'Connor, Redmond, WA (US); Sundar Paranthaman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 123 days.

(21) Appl. No.: 14/452,214

(22) Filed: Aug. 5, 2014

(65) Prior Publication Data

US 2016/0044116 A1  Feb. 11, 2016

(51) Int. Cl.
*G06F 15/177* (2006.01)
*H04L 29/08* (2006.01)
(Continued)

(52) U.S. Cl.
CPC .............. *H04L 67/16* (2013.01); *G06F 8/60* (2013.01); *G06F 8/63* (2013.01); *G06F 8/65* (2013.01); *G06F 9/5072* (2013.01); *H04L 41/08* (2013.01)

(58) Field of Classification Search
CPC ....... H04L 41/08; H04L 67/16; G06F 9/5072; G06F 8/63; G06F 8/65; G06F 8/60
(Continued)

(56) References Cited

U.S. PATENT DOCUMENTS 7,243,306 B1 * 7/2007 Joshi .................. G06F 8/10
707/999.001
8,234,650 B1 * 7/2012 Eppstein ............... G06F 9/5072
709/220
(Continued)

FOREIGN PATENT DOCUMENTS

WO   2008065422 A1   6/2008

OTHER PUBLICATIONS

"International Search Report & Written Opinion Issued in PCT Application No. PCT/US2015/043517", dated Nov. 4, 2015, 13 Pages.
(Continued)

*Primary Examiner* — Philip Chea
*Assistant Examiner* — Wing Ma
(74) *Attorney, Agent, or Firm* — Christopher J. Volkmann; Kelly, Holt & Christenson, PLLC

(57) ABSTRACT

Orchestration of infrastructure service blocks (ISBs) within a hosted service may be automated. A datacenter deploying the hosted service may include one or more zones, each zone including at least a network and a server farm comprising one or more servers performing various roles within an infrastructure of the hosted service. A first orchestrator may receive a network and server manifest from the datacenter to be configured within an automation framework of the first orchestrator to create an ISB and/or update another ISB for each zone of the datacenter. The created ISB and/or updated other ISB may be deployed to a second orchestrator that may image the servers within each zone of the datacenter with the created ISB and/or updated other ISB. The hosted service may then be deployed at the datacenter such that the servers within each zone of the datacenter include the created ISB and/or updated other ISB.

18 Claims, 8 Drawing Sheets

(51) Int. Cl.
    *H04L 12/24* (2006.01)
    *G06F 9/445* (2018.01)
    *G06F 9/50* (2006.01)
(58) Field of Classification Search
    USPC ........................................................ 709/220
    See application file for complete search history.

(56) References Cited

U.S. PATENT DOCUMENTS

| | | | | |
|---|---|---|---|---|
| 8,296,419 | B1* | 10/2012 | Khanna | G06F 9/5072 709/201 |
| 8,572,679 | B1 | 10/2013 | Wang et al. | |
| 2005/0091640 | A1* | 4/2005 | McCollum | G06F 11/0709 717/117 |
| 2008/0072316 | A1* | 3/2008 | Chang | G06F 12/1458 726/21 |
| 2008/0123559 | A1* | 5/2008 | Haviv | G06F 8/61 370/255 |
| 2008/0244577 | A1* | 10/2008 | Le | G06F 8/63 718/1 |
| 2009/0187413 | A1* | 7/2009 | Abels | G06Q 10/10 705/1.1 |
| 2009/0193439 | A1 | 7/2009 | Bernebeu-Auban et al. | |
| 2009/0276771 | A1* | 11/2009 | Nickolov | G06F 9/4856 717/177 |
| 2010/0198972 | A1* | 8/2010 | Umbehocker | G06F 3/0604 709/226 |
| 2010/0287280 | A1* | 11/2010 | Sivan | G06F 9/5072 709/226 |
| 2011/0126207 | A1* | 5/2011 | Wipfel | H04L 9/3213 718/104 |
| 2011/0154324 | A1* | 6/2011 | Pagan | G06F 9/45558 718/1 |
| 2011/0173605 | A1 | 7/2011 | Bourne | |
| 2012/0030672 | A1* | 2/2012 | Zygmuntowicz | G06F 8/60 718/1 |
| 2012/0054624 | A1* | 3/2012 | Owens, Jr. | H04L 41/22 715/735 |
| 2012/0072910 | A1* | 3/2012 | Martin | G06F 9/45533 718/1 |
| 2012/0192187 | A1 | 7/2012 | Mills et al. | |
| 2012/0226788 | A1* | 9/2012 | Jackson | G06F 9/505 709/223 |
| 2012/0239825 | A1* | 9/2012 | Xia | G06F 9/44505 709/250 |
| 2012/0240135 | A1* | 9/2012 | Risbood | G06F 8/61 719/328 |
| 2012/0246638 | A1* | 9/2012 | He | G06F 9/45558 718/1 |
| 2012/0259901 | A1* | 10/2012 | Lee | G06F 17/30283 707/827 |
| 2012/0265726 | A1* | 10/2012 | Padmanabhan | G06F 17/303 707/602 |
| 2012/0290348 | A1* | 11/2012 | Hackett | G06Q 10/06 705/7.13 |
| 2013/0111033 | A1* | 5/2013 | Mao | G06F 9/5072 709/226 |
| 2013/0145367 | A1* | 6/2013 | Moss | H04L 43/04 718/1 |
| 2013/0185457 | A1 | 7/2013 | Campbell | |
| 2013/0198346 | A1 | 8/2013 | Jubran et al. | |
| 2013/0232498 | A1* | 9/2013 | Mangtani | G06F 9/5072 718/104 |
| 2013/0254424 | A1* | 9/2013 | Guay | G06F 9/4856 709/238 |
| 2013/0263131 | A1 | 10/2013 | Beda, III | |
| 2013/0346260 | A1* | 12/2013 | Jubran | G06F 9/5072 705/28 |
| 2014/0006580 | A1* | 1/2014 | Raghu | G06F 9/5072 709/223 |
| 2014/0006581 | A1* | 1/2014 | Raghu | G06F 9/5072 709/223 |
| 2014/0032764 | A1* | 1/2014 | Akolkar | G06F 9/5072 709/226 |
| 2014/0047341 | A1* | 2/2014 | Breternitz | G06F 9/505 715/735 |
| 2014/0059226 | A1* | 2/2014 | Messerli | G06F 9/5072 709/226 |
| 2014/0074973 | A1 | 3/2014 | Kumar et al. | |
| 2014/0075431 | A1* | 3/2014 | Kumar | G06F 8/61 717/175 |
| 2014/0123129 | A1 | 5/2014 | Risbood et al. | |
| 2014/0149492 | A1* | 5/2014 | Ananthanarayanan | H04L 67/42 709/203 |
| 2014/0280796 | A1* | 9/2014 | Pijewski | H04L 41/0886 709/220 |
| 2014/0365522 | A1* | 12/2014 | Soundararajan | G06F 17/30587 707/770 |
| 2015/0020059 | A1* | 1/2015 | Davis | G06F 8/60 717/171 |
| 2015/0063166 | A1* | 3/2015 | Sif | G06F 9/45558 370/254 |
| 2015/0081873 | A1* | 3/2015 | Stein | G06Q 10/067 709/223 |
| 2015/0120818 | A1* | 4/2015 | Kim | H04L 67/10 709/203 |
| 2015/0149634 | A1* | 5/2015 | Nassaur | G06F 9/5072 709/226 |
| 2015/0215228 | A1* | 7/2015 | McMurry | H04L 47/70 709/226 |
| 2015/0263979 | A1* | 9/2015 | Kasturi | H04L 41/0896 709/226 |
| 2015/0281319 | A1* | 10/2015 | Maturana | G06F 9/5072 709/202 |
| 2015/0309780 | A1* | 10/2015 | Ruehl | H04L 67/1095 717/176 |
| 2016/0021197 | A1* | 1/2016 | Pogrebinsky | H04L 67/16 709/226 |
| 2016/0036795 | A1* | 2/2016 | Lietz | H04L 63/08 726/4 |

OTHER PUBLICATIONS

"Simplify and Accelerate Service Delivery with IBM SmartCloud Orchestrator: Cloud Management for your IT Services", Retrieved on: Jul. 22, 2014, Available at: http://www-01.ibm.com/common/ssi/cgi-bin/ssialias?subtype=ST&infotype=SA&appname=SWGE_TI_SV_USEN&htmlfid=T1J14006USEN&attachment=TIJ14006USEN.
"Cisco Virtualized Multiservice Data Center Framework: Deliver IT as a Service", in CISCO White Paper, Retrieved on: Jul. 22, 2014, 16 pages.
"ServiceNow Configuration Automation", Published on: Feb. 8, 2014, Available at: http://www.servicenow.com/products/orchestration/configuration-automation.html.
Ilieva, Savina, "VMware vCenter Orchestrator Blog", Published on: Jun. 4, 2014, Available at: http://blogs.vmware.com/orchestrator/.
"System Center Integration Pack for Microsoft SharePoint", Published on: Dec. 22, 2013, Available at: http://technet.microsoft.com/en-us/library/dn266021.aspx.
"Second Written Opinion Issued in PCT Application No. PCT/US2015/043517", dated Jun. 13, 2016, 5 Pages.
International Preliminary Report on Patentability for International Patent Application No. PCT/US2015/043517, dated Oct. 19, 2016, date of filing Aug. 4, 2015, 6 pages.

* cited by examiner

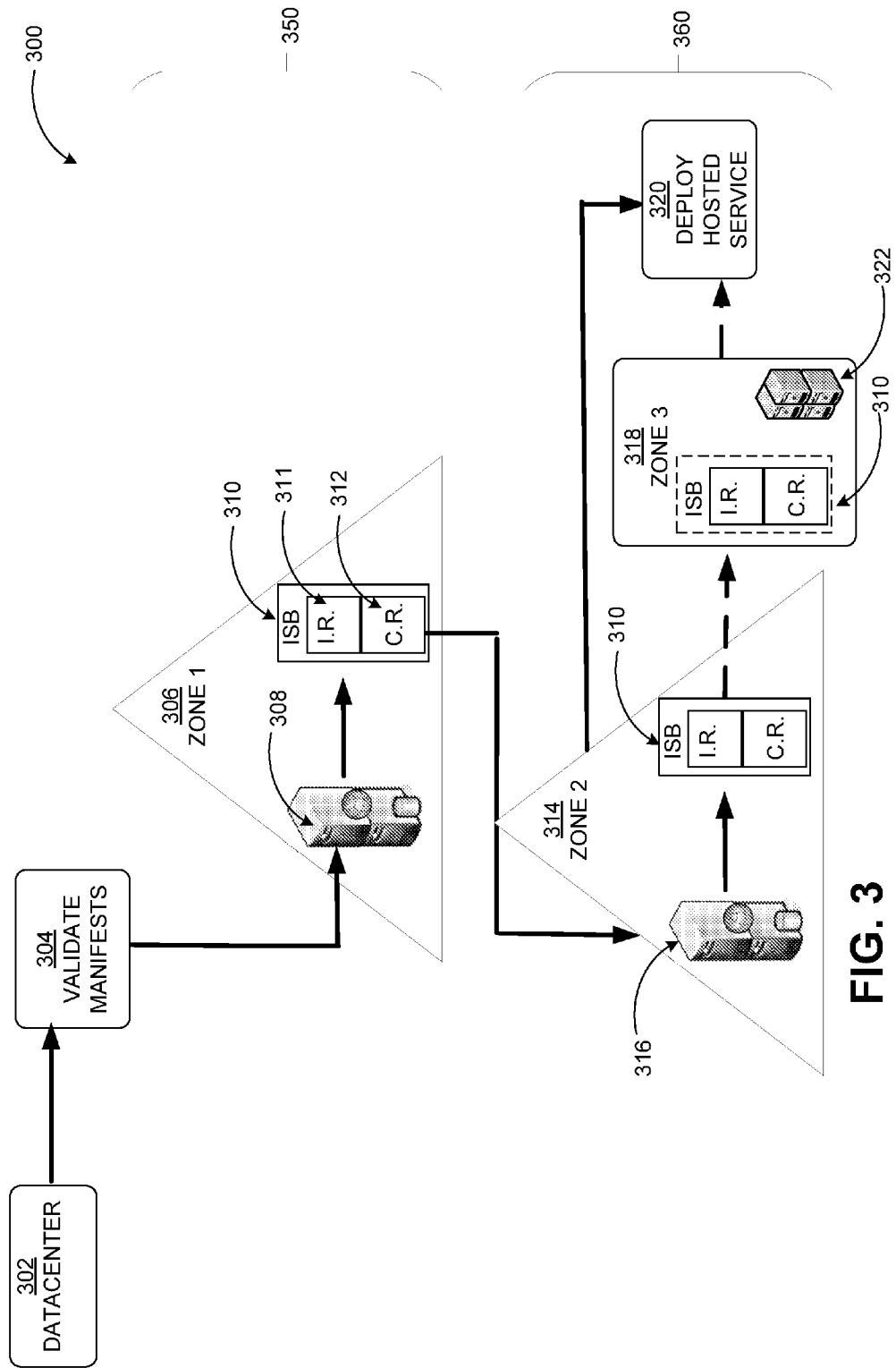

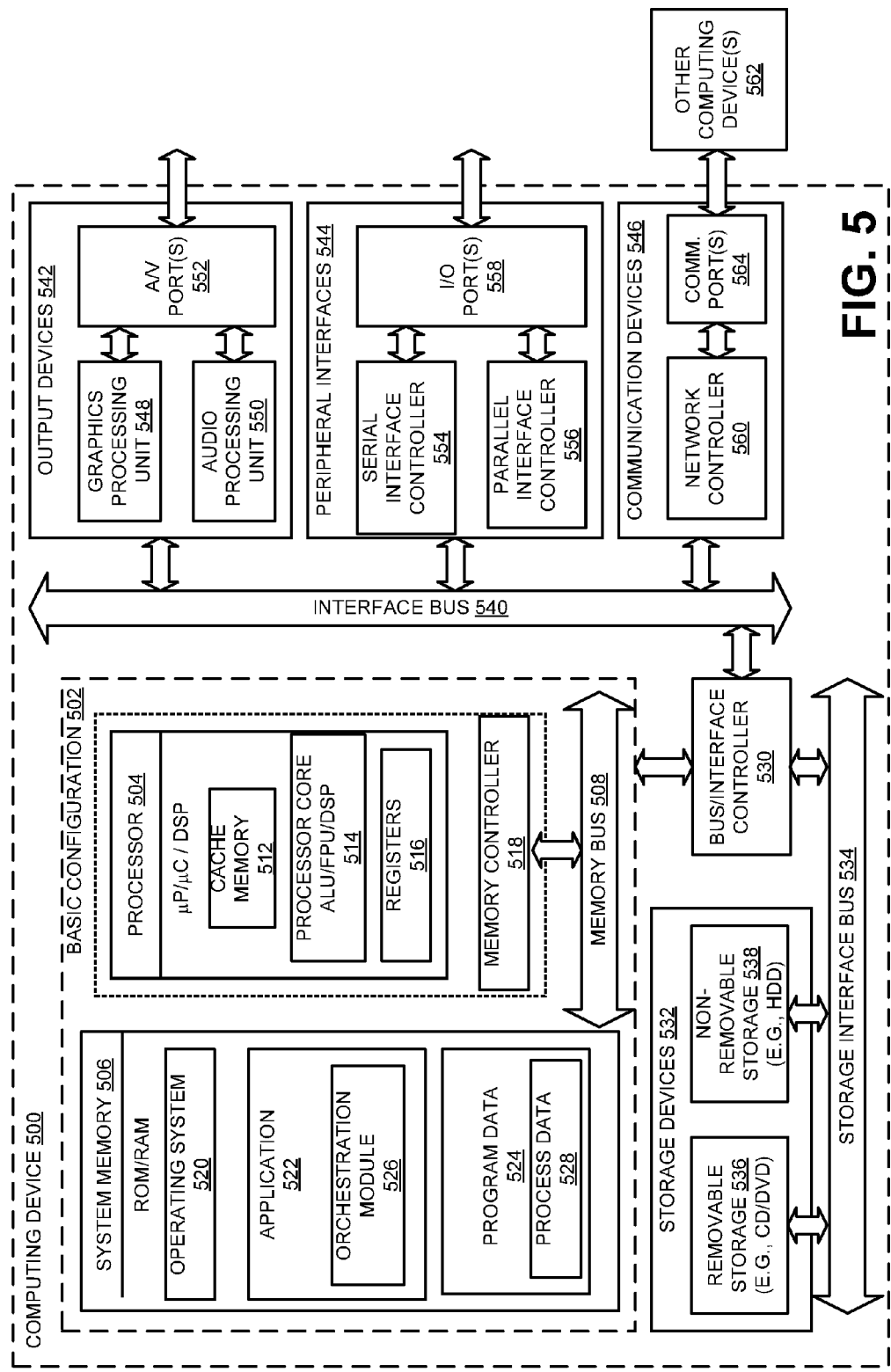

AUTOMATED ORCHESTRATION OF INFRASTRUCTURE SERVICE BLOCKS IN HOSTED SERVICES

BACKGROUND

Hosted services such as productivity applications, collaboration services, social and professional networking services, and similar ones are not only becoming increasingly popular, but also replacing individually installed local applications. Such services may vary from small size (a few hundred users) to very large (tens, possibly hundreds of thousands of users). Infrastructure for hosted services may be slow to rollout, as well as expensive to build and maintain, due to complexity caused by a larger number of server farms comprising a multitude of servers performing various roles within the infrastructure. Furthermore, conventional building and maintenance of the infrastructure may involve human staff, which may be inefficient and vulnerable to costly errors.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automated orchestration of infrastructure service blocks (ISBs) within a hosted service. A network manifest and a server manifest from a datacenter deploying the hosted service may be received at an automation framework of a first orchestrator, where the datacenter deploying the hosted service may include a plurality of zones. The network manifest and the server manifest may be configured within the automation framework of the first orchestrator to create an ISB or to update another ISB for each zone of the datacenter. The created ISB or the updated other ISB may be deployed to a second orchestrator, such that the second orchestrator is enabled to image servers within each zone of the datacenter with the created ISB or the updated other ISB. The hosted service may be deployed at the datacenter such that the servers within each zone of the datacenter include the created ISB or the updated other ISB.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 3 illustrates an example process to automate orchestration of ISBs within a hosted service;

FIG. 5 is a block diagram of an example general purpose computing device, which may be used to automate orchestration of ISBs within a hosted service.

DETAILED DESCRIPTION

Figure 1A:
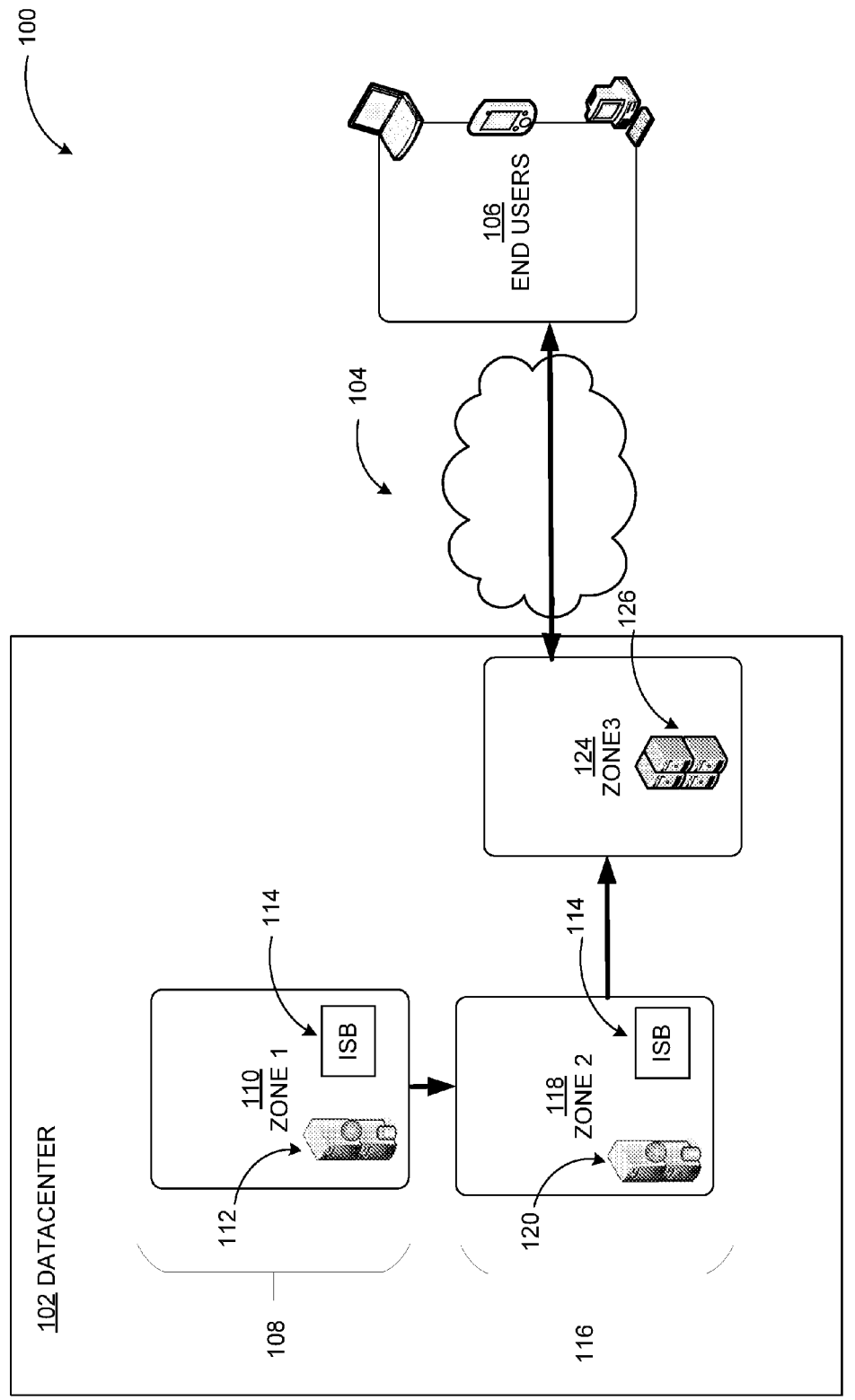
FIGS. 1A and 1B include example network environments where automated orchestration of infrastructure block services (ISBs) within a hosted service may be implemented.

As briefly described above, orchestration of infrastructure service blocks (ISBs) within a hosted service may be automated. A datacenter deploying the hosted service may include one or more zones, where each zone includes at least one network and at least one server farm comprising one or more servers, the servers performing various roles within the infrastructure of the hosted service. In order to simplify the infrastructure, these various server roles may be collapsed and integrated into an automation framework to create and/or update the ISBs with which the servers may be imaged with before deployment of the hosted service at the datacenter. Simplifying the infrastructure through automation may enable faster rollout, and enable the infrastructure to be more easily built and maintained with less human staff intervention, reducing inefficiency and vulnerability to costly errors.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for automatic orchestration of ISBs. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
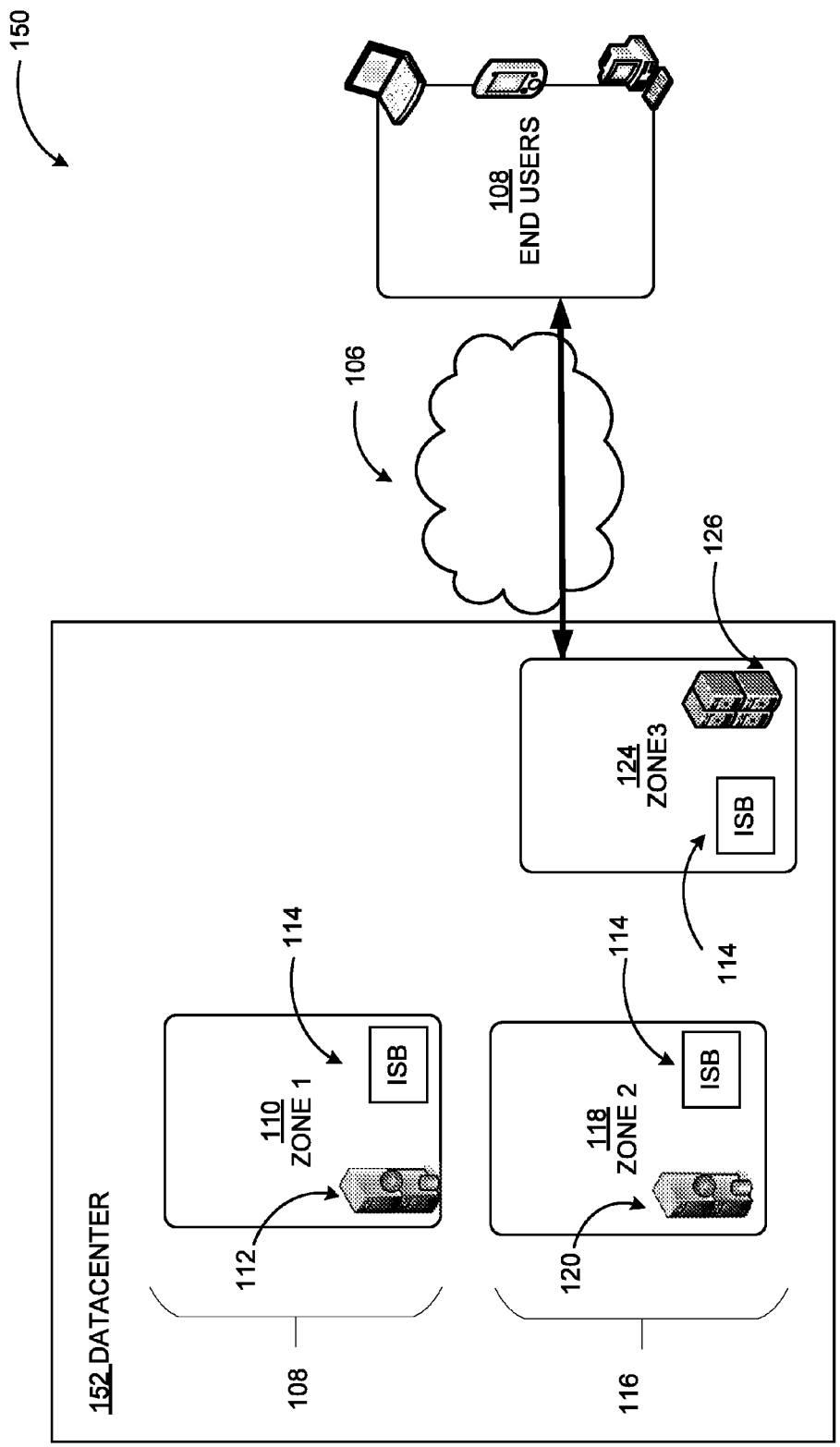

FIGS. 1A and 1B include example network environments where automated orchestration of ISBs with a hosted service may be implemented;

In FIG. 1A, a datacenter 102 as shown in diagram 100 may include a dedicated customer on multi-tenant infrastructure that supports a hosted service providing a variety of services to users 106. The services may include, but are not limited to desktop services, collaboration services, word processing, presentation, business data processing, graphics, and similar ones. In an example system, users 106 may access the hosted service(s) through thin or thick client applications executed on their client devices via a network, such as a cloud 104. For example, a browser executed on a client device may access a collaboration service and provide a user interface for the users 106 to take advantage of the service's capabilities. In another example, a locally installed thick client application (a client application with specific, dedicated capabilities) may access the hosted service to provide additional services or coordinate activities with other users, hosting entity, etc. Data associated with the hosted service may be stored on data storage within the datacenter 102.

The datacenter 102 may include a multitude of zones contained within one or more domains. Each zone may include at least a network and a server farm comprising one or more servers. The datacenter 102 may include at least a first domain 108, where the first domain 108 is an administrative domain. The first domain 108 may include a first zone 110, the first zone comprising a first orchestrator 112 and one or more ISBs 114. In some examples, the datacenter 102 may include a second domain 116, where the second domain 116 is a customer domain. The second domain 116 may include a second zone 118 comprising a second orchestrator 120 and the ISBs 114, and a third zone 124 comprising one or more server farms 126 associated with the hosted service.

As previously mentioned, each zone of the datacenter 102 may further include at least one server farm comprising one or more servers. The hosted service deployed by the datacenter 102 may provide a variety of services through one or more applications executed on the servers of the server farms within the datacenter 102. In some cases, different servers of the server farms may take on different roles. For example, some servers may manage data storage (e.g., database servers), other servers may execute applications, and yet other servers may enable interaction of the client applications with the servers (e.g., web rendering or front end servers).

In FIG. 1B, a datacenter 152 as shown in diagram 150 may include a multi-tenant infrastructure that supports a hosted service providing a variety of services to the users 106. Similar to the datacenter 102, the datacenter 152 may include a multitude of zones contained within one or more domains, where each zone may include at least a network and a server farm comprising one or more servers. The datacenter 152 may include the first domain 108 and the second domain 116. The first domain 108 may include the first zone 110 comprising the first orchestrator 112 and the ISBs 114. The second domain 116 may include the second zone 118 comprising the second orchestrator 120 and the ISBs 114, and the third zone 124 comprising the server farms 126 associated with the hosted service. Unique from the datacenter 102 discussed in conjunction with FIG. 1A, the third zone 124 further includes the ISBs 114.

Figure 2:
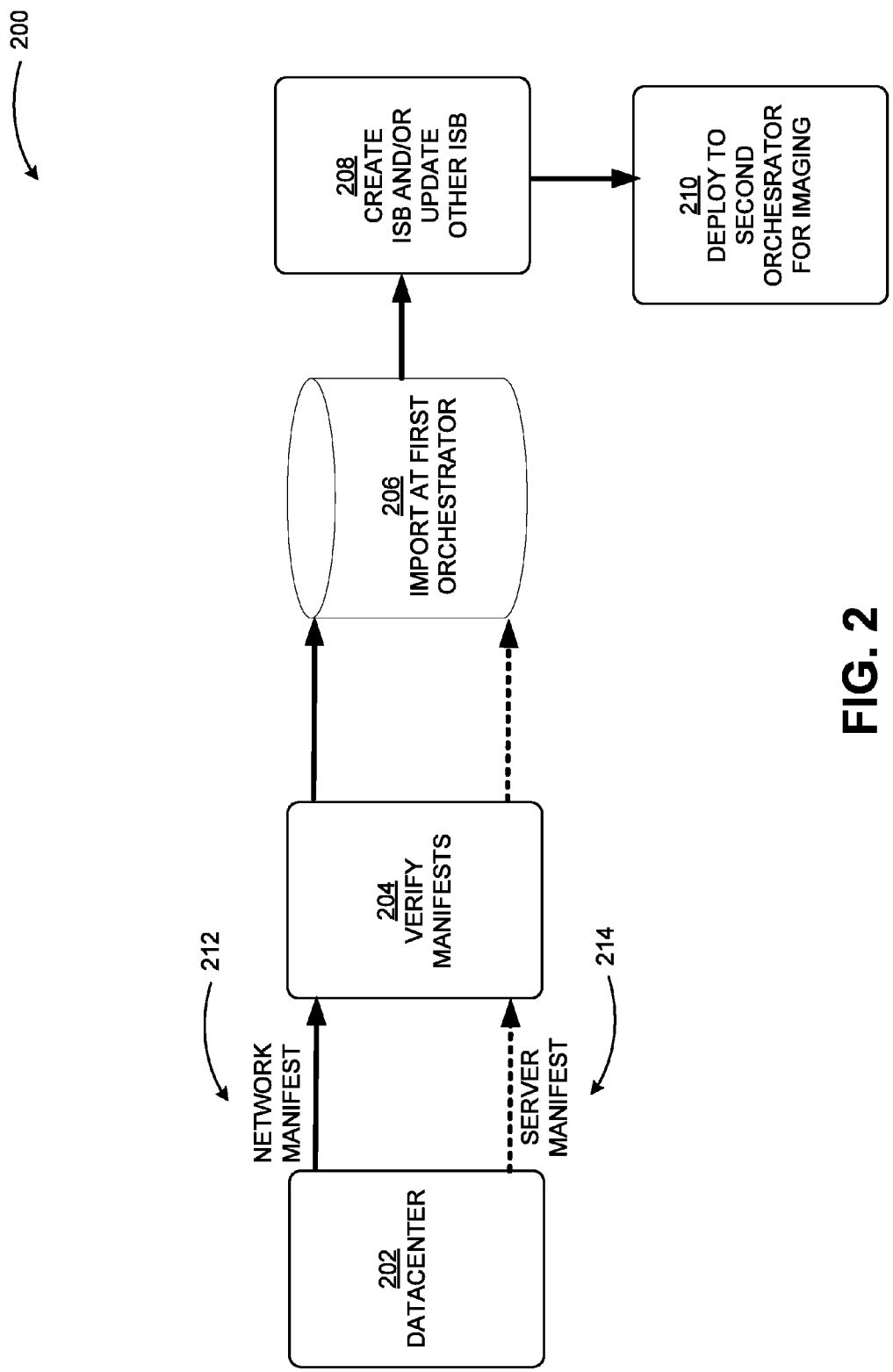
FIG. 2 illustrates an example process performed by a first orchestrator to initiate automated orchestration of ISBs within a hosted service.

FIG. 2 illustrates an example process performed by a first orchestrator to initiate automated orchestration of ISBs within a hosted service, according to embodiments.

A datacenter deploying a hosted service, such as datacenter 202 as shown in diagram 200, may include one or more zones, where each zone includes at least a network and a server farm comprising one or more servers performing various roles within an infrastructure of the hosted service. A first orchestrator, executed by a server within a first zone of the datacenter, may import 206 a network manifest 212 and a server manifest 214 from the datacenter 202 at an automation framework of the first orchestrator. In some examples, the first orchestrator may be a grid manager. Prior to importing the network manifest 212 and the server manifest 214, a quality of the network manifest 212 and the server manifest 214 may be verified 204. The network manifest 212 and server manifest 214 may include one or more extensible markup language (XML) files that contain information associated with the contents and distribution of networks and servers within the datacenter, for example, a role of each server within the datacenter. The network manifest 212 and server manifest 214 may be embedded, as a resource, inside a program file associated with the hosted service or may be located in a separate external XML file. The network manifest 212 and the server manifest 214 may be configured within the automation framework of the first orchestrator to create an ISB and/or update another ISB 208. The created ISB and/or the updated other ISB may be stateless, including one or more infrastructure roles and one or more communication-based roles corresponding to the various roles performed by the one or more servers within each zone of the datacenter. The infrastructure roles may include at least a directory service, a distributed file system service, and a deployment service, for example. The communication-based roles may include at least an alert forwarding service, an alert correlation service, a local area messaging service, a system center operations management service, and a transition formula evaluation service, for example.

The first orchestrator may then be configured to deploy 210 the created ISB and/or other updated ISB to a second orchestrator, executed by another server within a second zone of the datacenter. In some examples, the second orchestrator may be a stamp manager. The second orchestrator may be enabled to image the one or more servers within each zone of the datacenter with the created ISB and/or other updated ISB such that the servers within each zone of the datacenter include the created ISB or the updated other ISB when the hosted service is deployed at the datacenter. For example, imaging the servers within each zone of the datacenter enables a server without an operating system to be imaged with the created ISB to automatically create a role of the server based on the created ISB, and another server with an operating system to be imaged with the updated other ISB to automatically update a role of the other server based on the updated other ISB.

FIG. 3 illustrates an example process to automate orchestration of ISBs within a hosted service, according to embodiments.

A datacenter deploying a hosted service, such as datacenter 302 as shown in diagram 300, may include one or more zones, where each zone includes at least a network and a server farm comprising one or more servers performing various roles within an infrastructure of the hosted service. The datacenter 302 may also include one or more domains, such as a first administrative domain 350 and a second customer domain 360. In the first administrative domain 350, a first orchestrator 308, executed by a server within a first zone 306 of the datacenter, may import a network manifest and a server manifest from the datacenter 302 at an automation framework of the first orchestrator 308. Prior to importing the network manifest and the server manifest, a quality of the network manifest and the server manifest may be verified 304. The network manifest and the server manifest may be configured within the automation framework of the first orchestrator to create and/or update one or more ISBs 310, where the manifests may contain information associated with the contents and distribution of networks and servers within the datacenter 302, for example, a role of each server within the datacenter 302. The ISBs 310 may be stateless, including one or more infrastructure roles 311 and one or more communication-based roles 312 corresponding to the various roles performed by the one or more servers within each zone of the datacenter. The infrastructure roles 311 may include at least a directory service, a distributed file system service, and a deployment service, for example. The communication-based roles 312 may include at least an alert forwarding service, an alert correlation service, a local area messaging service, a system center operations management service, and a transition formula evaluation service, for example.

The first orchestrator 308 may then be configured to deploy the created and/or updated ISBs 310 to a second orchestrator 316, executed by another server within a second zone 314 of the datacenter, located in the second customer domain 360. The second orchestrator 316 may be enabled to image the one or more servers within each zone of the datacenter 302 with the created and/or updated ISBs 310 such that the servers within each zone of the datacenter 302 include the created and/or updated ISBs 310 when the hosted service is deployed 320 at the datacenter 302. Imaging the servers within each zone of the datacenter 302 enables a server without an operating system to be imaged with the created ISB to automatically create a role of the server based on the roles of the created ISB, and another server with an operating system to be imaged with the updated other ISB to automatically update a role of the other server based on the roles of the updated other ISB. In some examples, a function of the roles of the created and/or updated ISBs 310 may be validated after the hosted service is deployed.

In some examples, the second orchestrator 316 may be configured to deploy the created and/or updated ISBs 310 to a third zone 318, located in the second customer domain 360 comprising one or more server farms associated with the hosted service 322. The created and/or updated ISBs 310 may be deployed such that the servers within each zone of the datacenter 302 include the created and/or updated ISBs 310 when the hosted service is deployed 320 at the datacenter 302. In such examples, the infrastructure of the datacenter 302 may be a multi-tenant infrastructure. In other examples, where the infrastructure of the datacenter 302 is instead a dedicated customer on multi-tenant infrastructure, the third zone 318 may only include the server farms associated with the hosted service 322.

Figure 4A:
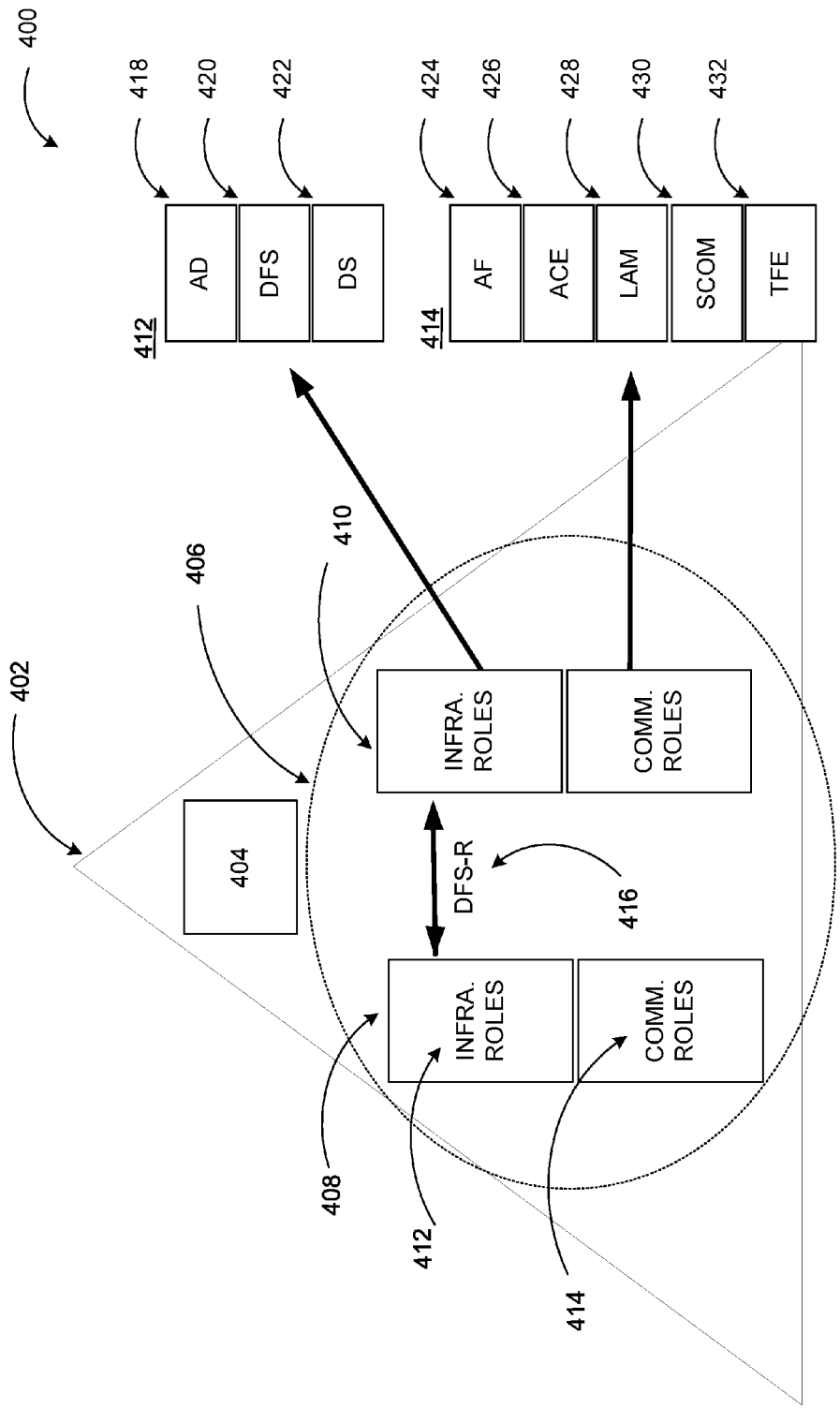
FIGS. 4A and 4B illustrate example configurations of one or more zones within a datacenter deploying a hosted service.
Figure 4B:
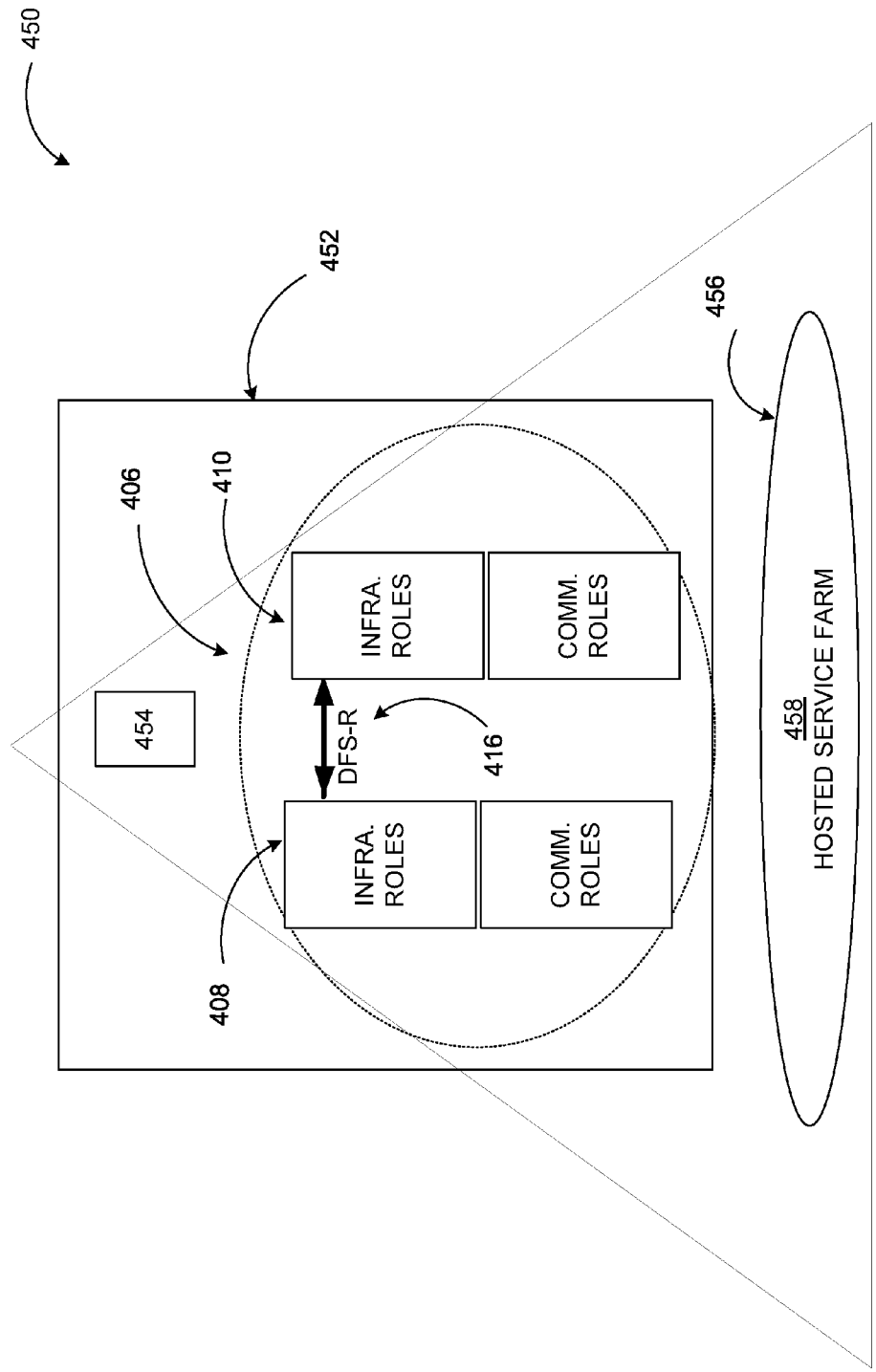

FIGS. 4A and 4B illustrate example configurations of one or more zones within a datacenter deploying a hosted service, according to embodiments.

A datacenter deploying a hosted service may include one or more zones, where each zone includes at least a network and a server farm comprising one or more servers performing various roles within an infrastructure of the hosted service. Diagram 400 of FIG. 4A depicts a first domain of the datacenter deploying the hosted service. The first domain may be an administrative domain, and may include a first zone 402 comprising a first orchestrator 404 and one or more ISBs 406, where the one or more ISBs are a created ISB 408 or an updated other ISB 410. The first orchestrator 404 may be configured to receive, at an automation framework of the first orchestrator 404, a network manifest and a server manifest from the datacenter, where the manifests may contain information associated with the contents and distribution of networks and servers within the datacenter, for example, a role of each server within the datacenter. The first orchestrator 404 may configure the network and server manifests within the automation framework to create the ISB or to update the other ISB for each zone of the datacenter, and deploy the created ISB 408 or the updated other ISB 410 to a second orchestrator 454, depicted in FIG. 4B. The created ISB 408 and/or the updated other ISB 410 may be stateless and may include one or more infrastructure roles 412 and one or more communication-based roles 414 corresponding to the various roles performed by the one or more servers of the datacenter. The one or more infrastructure roles 412 may include at least a directory service 418, a distributed file system service 420, and a deployment service 422, for example. The one or more communication-based roles 414 may include at least an alert forwarding service 424, an alert correlation service 426, a local area messaging service 428, a system center operations management service 430, and a transition formula evaluation service 432, for example.

In FIG. 4B, diagram 450 depicts a second domain of the datacenter deploying the hosted service. The second domain may be a customer domain, and may include a second zone 452 comprising the second orchestrator 454 and the one or more ISBs 406, where the ISBs 406 include the created ISB 408 and/or the updated other ISB 410 deployed by the first orchestrator 404, depicted in diagram 400 of FIG. 4A. The second orchestrator 454 may be enabled to image one or more servers within each zone of the datacenter with the created ISB 408 and/or the updated other ISB 410, and deploy the hosted service at the datacenter such that the servers within each zone of the datacenter include the created ISB 408 and/or the updated other ISB 410. Some servers within each zone of the datacenter may include an operating system, while other servers within each zone of the datacenter may not include an operating system, colloquially termed as a bare machine. Whether the servers get imaged with the created ISB 408 or the updated other ISB 410 may depend on if the servers have operating systems. For example, a server without an operating system may be imaged with the created ISB 408 to automatically create a role of the server based on the created ISB 408. Alternatively, a server with an operating system may be imaged with the updated other ISB 410 to automatically update a role of the server based on the updated other ISB 410.

The second domain may also include a third zone 456 comprising at least one or more server farms 458 associated with the hosted service. In some examples, the third zone 456 may further include the one or more ISBs 406, where the ISBs 406 include the created ISB 408 and/or the updated other ISB 410, deployed to the third zone 456 by the second orchestrator 454. In such examples, the datacenter comprises a multi-tenant infrastructure.

The examples in FIG. 1 through 4 have been described with specific platforms including infrastructures, datacenters, domains, servers, applications, and orchestrators. Embodiments are not limited to systems according to these example configurations. Automatic orchestration of ISBs may be implemented in configurations using other types of platforms including infrastructures, datacenters, domains, servers, applications, and orchestrators in a similar manner using the principles described herein.

FIG. 5 and the associated discussion are intended to provide a brief, general description of a general purpose computing device, which may be used to automate orchestration of ISBs within a hosted service.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, an application 522, and program data 524. The application 522 may be executed by one or more of a plurality of servers of a datacenter deploying a hosted service. The application 522 may include an orchestration module 526, which may be an integral part of the application or a separate application on its own. The orchestration module 526 may include a first orchestrator executed by another server of the datacenter and a second orchestrator executed by a further server of the datacenter. The first orchestrator may be configured to receive, at an automation framework of the first orchestrator, a network manifest and a server manifest from the datacenter, configure the network and server manifests within the automation framework to create an ISB or to update another ISB for each zone of the datacenter, and deploy the created ISB or the updated other ISB to the second orchestrator. The second orchestrator may be enabled to image the plurality of servers within each zone of the datacenter with the created ISB or the updated other ISB, and deploy the hosted service at the datacenter such that the plurality of servers within each zone of the datacenter include the created ISB or the updated other ISB. The program data 524 may include, among other data, process data 528 related to the infrastructure and communication-based roles of the created ISB and/or the updated other ISB, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to automate orchestration of ISBs within a hosted service. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
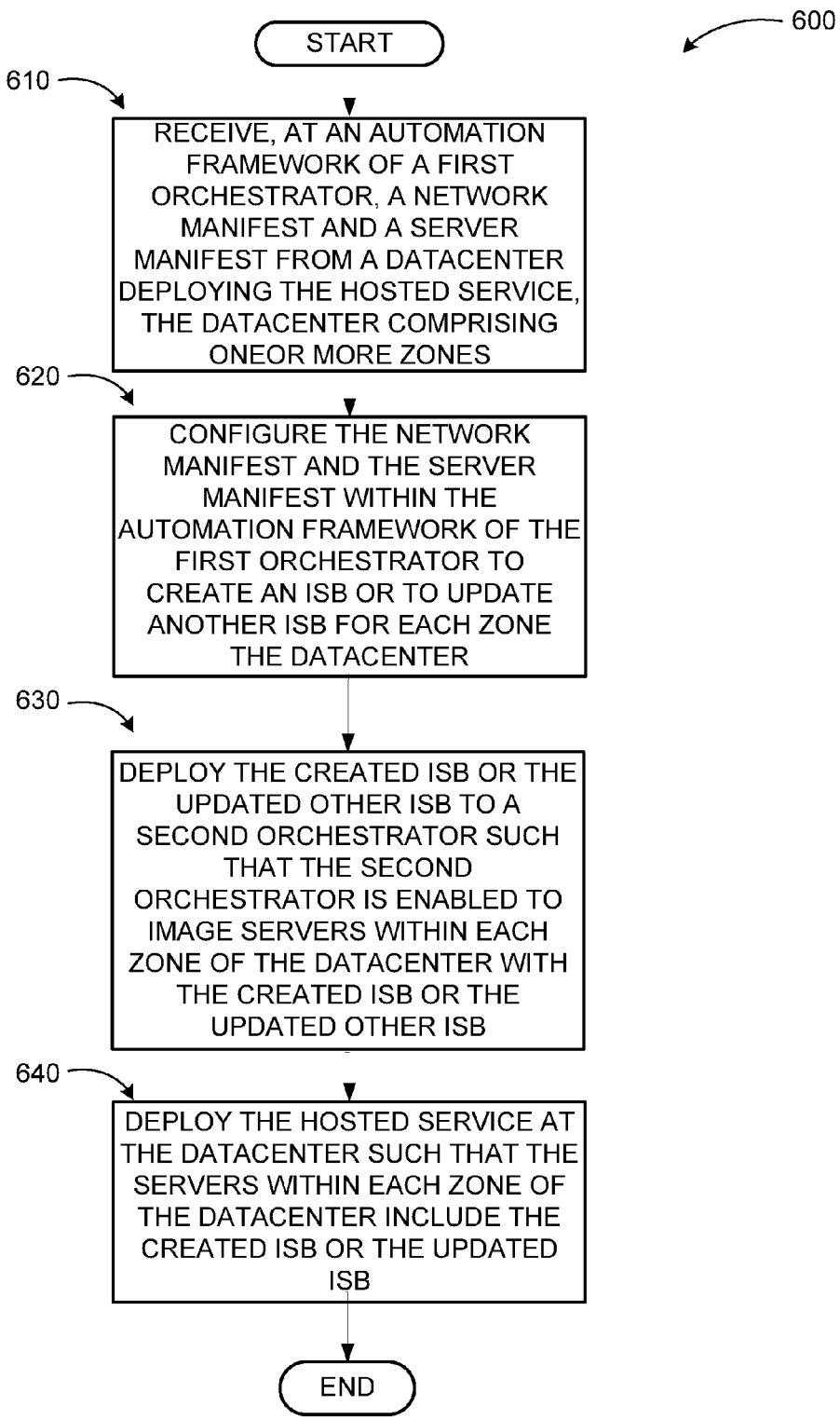
FIG. 6 illustrates a logic flow diagram of a method to automate orchestration of ISBs within a hosted service, according to embodiments.

FIG. 6 illustrates a logic flow diagram for process 600 of a method to automate orchestration of ISBs within a hosted service, according to embodiments. Process 600 may be implemented on a server or other system.

Process 600 begins with operation 610, receive, at an automation framework of a first orchestrator, a network manifest and a server manifest from a datacenter deploying a hosted service. The first orchestrator may be a grid manager and the hosted service may be a collaboration service, for example. The datacenter may include one or more zones, where each zone includes at least a network and a server farm comprising one or more servers performing various roles within an infrastructure of the hosted service. The network manifest and server manifest may include one or more extensible markup language (XML) files that contain information associated with the contents and distribution of networks and servers within the datacenter, for example, a role of each server within the datacenter. The manifests may be embedded, as a resource, inside a program file associated with the hosted service or may be located in a separate external XML file. In some examples, prior to importing the manifests, a quality of the network manifest and server manifest may be verified at the automation framework of the first orchestrator.

At operation 620, the network manifest and the server manifest may be configured within the automation framework of the first orchestrator to create an ISB or to update another ISB for each zone of the datacenter. The created ISB and/or the updated other ISB may be stateless and may include one or more infrastructure roles and one or more communication-based roles corresponding to the various roles performed by the one or more servers of the datacenter. The one or more infrastructure roles may include at least a directory service, a distributed file system service, and a deployment service, for example. The one or more communication-based roles may include at least an alert forwarding service, an alert correlation service, a local area messaging service, a system center operations management service, and a transition formula evaluation service, for example.

At operation 630, the created ISB or the updated other ISB may be deployed to a second orchestrator such that the second orchestrator may be enabled to image one or more servers within each zone of the datacenter with the created ISB or the updated other ISB. The second orchestrator may be a stamp manager, for example, that may enable a server without an operating system, colloquially termed a bare machine, to be imaged with the created ISB to automatically create a role of the server based on the created ISB. Alternatively, the stamp manager may enable another server with an operating system to be imaged with the updated other ISB to automatically update a role of the other server based on the updated other ISB.

At operation 640, the hosted service may be deployed at the datacenter such that the one or more servers within each zone of the datacenter include the created ISB or the updated other ISB. In some examples, a function of the one or more roles of the created ISB and/or the updated other ISB may be validated after the hosted service is deployed.

The infrastructure of the hosted service may be simplified by the above-described collapse and integration of various server roles into the automation framework of the first orchestrator to create the ISB and/or update the other ISB. Simplifying the infrastructure through automation may enable faster rollout, and enable the infrastructure to be more easily built and maintained with less human staff intervention, reducing inefficiency and vulnerability to costly errors.

The operations included in process 600 are for illustration purposes. Automated orchestration of ISBs within a hosted service may be implemented by similar processes with fewer or additional steps, as well as in different order of operations using the principles described herein.

According to some examples, methods to automate orchestration of infrastructure service blocks (ISBs) within a hosted service are provided. An example method may include receiving, at an automation framework of a first orchestrator, a network manifest and a server manifest from a datacenter deploying the hosted service, the datacenter comprising a plurality of zones, and configuring the network manifest and the server manifest within the automation framework of the first orchestrator to create an ISB or to update another ISB for each zone of the datacenter. The example method may also include deploying the created ISB or the updated other ISB to a second orchestrator, such that the second orchestrator is enabled to image servers within each zone of the datacenter with the created ISB or the updated other ISB, and deploying the hosted service at the datacenter such that the servers within each zone of the datacenter include the created ISB or the updated other ISB.

In other examples, a quality of the network manifest and the server manifest from the datacenter may be verified prior to importing at the automation framework of the first orchestrator. A function of one or more roles of the created ISB or the updated other ISB may be validated after the hosted service is deployed, the roles of the created ISB or the updated other ISB including at least a directory service, a distributed file system service, a deployment service, an alert forwarding service, an alert correlation service, a local area messaging service, a system center operations managing service, and a transition formula evaluation service.

In further examples, deploying the created ISB or the updated other ISB to the second orchestrator may include enabling a server without an operating system to be imaged with the created ISB to automatically create a role of the server based on the one or more roles of the created ISB, and enabling another server with an operating system to be imaged with the updated other ISB to automatically update a role of the other server based on the one or more roles of the updated other ISB. The first orchestrator may be a grid manager, the second orchestrator is a stamp manager, and the hosted service is a collaboration service.

According to some embodiments, systems to automate orchestration of infrastructure service blocks (ISBs) within a hosted service are described. An example system may include a datacenter comprising a plurality of zones, where each zone comprises at least a network and a server farm comprising a plurality of servers, a portion of the plurality of servers configured to deploy the hosted service, and a server of the datacenter configured to execute a first orchestrator. The first orchestrator may be configured to receive, at an automation framework of a first orchestrator, a network manifest and a server manifest, configure the network manifest and the server manifest within the automation framework of the first orchestrator to create an ISB or to update another ISB for each zone of the datacenter, and deploy the created ISB or the updated other ISB to a second orchestrator. Another server of the datacenter may be configured to execute the second orchestrator, where the second orchestrator may be configured to image the plurality of servers within each zone of the datacenter with the created ISB or the updated other ISB, and deploy the hosted service at the datacenter such that the plurality of servers within each zone of the datacenter include the created ISB or the updated other ISB.

In other embodiments, the plurality of servers may comprise one or more servers with an operating system and one or more other servers without an operating system. The created ISB and the updated other ISB may be stateless and may include one or more infrastructure roles and one or more communication-based roles corresponding to roles of the plurality of servers within each zone of the datacenter. The infrastructure roles may include at least a directory service, a distributed file system service, and a deployment service. The one or more communication-based roles may include at least an alert forwarding service, an alert correlation service, a local area messaging service, a system center operations management service, and a transition formula evaluation service.

In further embodiments, the datacenter may include at least one of a first domain and a second domain. The first domain may be an administrative domain and the second domain may be a customer domain. The plurality of zones may include a first zone comprising the first orchestrator and the created ISB or the updated other ISB. The plurality of zones may further include a second zone comprising the second orchestrator and the created ISB or the updated other ISB. The plurality of zones may include a third zone comprising one or more server farms associated with the hosted service if an infrastructure of the datacenter is a dedicated customer on multi-tenant infrastructure. The third zone may further comprise the created ISB or the updated other ISB if an infrastructure of the datacenter is a multi-tenant infrastructure.

According to some examples, a computer-readable memory device with instructions stored thereon to automate orchestration of infrastructure service blocks (ISBs) within a hosted service, is described. Example instructions may include receiving, at an automation framework of a first orchestrator, a network manifest and a server manifest from a datacenter deploying the hosted service, the datacenter comprising a plurality of zones, and configuring the network manifest and the server manifest within the automation framework of the first orchestrator to create an ISB or to update another ISB for each zone of the datacenter. The example instructions may also include deploying the created ISB or the updated other ISB to a second orchestrator, such that the second orchestrator is enabled to image servers within each zone of the datacenter with the created ISB or the updated other ISB, and deploying the hosted service at the datacenter such that the servers within each zone of the datacenter include the created ISB or the updated other ISB.

In other examples, the network manifest and the server manifest may include information associated with a content and a distribution of one or more networks and servers within the datacenter.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to automate orchestration of an infrastructure service block (ISB) within a hosted service that is deployed at a datacenter comprising a plurality of servers configured in a plurality of zones, each zone comprising a network and one or more of the servers, the method comprising:

receiving, at an automation framework of a first orchestrator executed by a first one of the plurality of servers, a network manifest and a server manifest from the datacenter deploying the hosted service, wherein the received network and server manifests comprise information associated with content and distribution of the networks and the servers within the datacenter;

defining, by the automation framework of the first orchestrator, an infrastructure service block (ISB) based on the received network and server manifests, wherein the ISB is defined by at least one of creating a new ISB or updating an existing ISB, and the ISB defines one or more infrastructure roles and one or more communication-based roles corresponding to roles of servers within each zone of the datacenter, and defines a server configuration for deploying the hosted service at the datacenter;

deploying, by the automation framework of the first orchestrator, the ISB to a second orchestrator executed by a second one of the plurality of servers;

for each particular zone of the plurality of zones,
configuring, by the second orchestrator executed by the second server, at least one server within the particular zone such that the at least one server is configured in accordance with the ISB, wherein each configured server is imaged using the ISB to define a role of the server in hosting the hosted service, wherein the role of the server comprises at least one of an infrastructure role or a communication-based role defined by the ISB; and deploying the hosted service at the datacenter using the configured servers.

2. The method of claim 1 wherein the first orchestrator is executed by the first server in an administrative domain, and the second orchestrator is executed by the second server in a customer domain.

3. The method of claim 1, wherein the role of the server comprises an infrastructure role configured to execute at least one of:
a directory service, a distributed file system service, or a deployment service.

4. The method of claim 3, wherein deploying the ISB to the second orchestrator comprises:
enabling a server without an operating system to be imaged with the ISB to automatically create a role of the server based on the one or more roles of the ISB.

5. The method of claim 3, wherein deploying the ISB to the second orchestrator further comprises:
enabling a server with an operating system to be imaged with the ISB to automatically update a role of the server based on the one or more roles of the ISB.

6. The method of claim 1, wherein the first orchestrator is a grid manager, the second orchestrator is a stamp manager, and the hosted service is a collaboration service.

7. A system to automate orchestration of an infrastructure service block (ISB) within a hosted service, the system comprising:
a datacenter comprising a plurality of servers configured in one or more zones, wherein each zone comprises at least a network and one or more of the servers, wherein a portion of the plurality of servers are configured to deploy the hosted service;
a first orchestrator executed by a hardware component of the datacenter, wherein the first orchestrator is configured to:
receive, at an automation framework of the first orchestrator, a network manifest and a server manifest, wherein the received network and server manifests comprise information associated with content and distribution of networks and servers within the datacenter;
define, by the automation framework of the first orchestrator, an infrastructure service block (ISB) based on the received network and server manifests, wherein the ISB is defined by at least one of creating a new ISB or updating an existing ISB, and the ISB defines a server configuration for deploying the hosted service at the datacenter; and
deploy, by the automation framework of the first orchestrator, the ISB to a second orchestrator; and
a second orchestrator executed by a hardware component of the datacenter,
wherein the second orchestrator is configured to:
for each particular zone of the one or more zones,
image a first server, with an operating system, using the ISB to automatically update a role of the first server in hosting the hosted service,
the updated role comprising at least one of an infrastructure role or a communication-based role, and
image a second server, without an operating system, with the ISB to automatically create a role of the second server in hosting the hosted service,
the created role comprising at least one of an infrastructure role or a communication-based role.

8. The system of claim 7, wherein the ISB is stateless.

9. The system of claim 7, wherein the role comprises an infrastructure role configured to execute at least one of:
a directory service, a distributed file system service, or a deployment service.

10. The system of claim 7, wherein the role comprises a communication-based role configured to execute at least one of:
an alert forwarding service, an alert correlation service, a local area messaging service, a system center operations management service, or a transition formula evaluation service.

11. The system of claim 7, wherein the datacenter includes at least one of a first domain and a second domain.

12. The system of claim 11, wherein the first orchestrator is executed by the first server in an administrative domain and the second orchestrator is executed by the second server in a customer domain.

13. The system of claim 7, wherein the plurality of zones include a first zone comprising the first orchestrator and the ISB.

14. The system of claim 7, wherein the plurality of zones include a second zone comprising the second orchestrator and the ISB.

15. The system of claim 7, wherein the plurality of zones include a third zone comprising one or more server farms associated with the hosted service if an infrastructure of the datacenter is a dedicated customer on multi-tenant infrastructure.

16. The system of claim 15, wherein the third zone further comprises the ISB if an infrastructure of the datacenter is a multi-tenant infrastructure.

17. The method of claim 2, wherein the role of the server comprises a communication-based role configured to execute at least one of:
an alert forwarding service, an alert correlation service, a local area messaging service, a system center operations managing service, or a transition formula evaluation service.

18. The method of claim 1, further comprising:
verifying a quality of the network manifest and the server manifest from the datacenter prior to importing at the automation framework of the first orchestrator.

* * * * *